United States Patent Office 3,813,322

Patented May 28, 1974

3,813,322

RADIATION CURABLE STYRENATED POLYESTER COATING COMPOSITIONS AND PROCESS OF CURING THEM

Hargovind Nihchaldas Vazirani, Passaic Township, Morris County, N.J., assignor to Bell Telephone Laboratories, Incorporated, Murray Hill and Berkeley Heights, N.J.

No Drawing. Filed Dec. 29, 1971, Ser. No. 213,737
Int. Cl. C08g *1/18*
U.S. Cl. 204—159.15 8 Claims

ABSTRACT OF THE DISCLOSURE

The radiation curable styrenated polyester resins described herein are based upon from 60 to 75 weight percent of a polyester which is the esterification product of maleic anhydride and trimellitic anhydride, one or more short-chain diols such as propylene glycol and a long-chain aliphatic compound such as castor oil. The remainder of the resins include styrene (from 25 to 40 weight percent) up to 50 weight percent of which may be substituted by acrylates such as methyl methacrylate. The resins may additionally contain one or more ultraviolet sensitizers, and one or more inhibitors. Upon curing, the resins are characterized by mechanical toughness and flexibility and are useful for example as cover coats for flexible printed circuit boards and as wire coatings.

BACKGROUND OF THE INVENTION

(1) Field of the invention

This invention relates to radiation curable styrenated polyester resins and more particularly to such resins based upon polyesters containing long-chain aliphatic compounds and also relates to the process of curing these resins.

(2) Prior art

The concept of flat-conductor flexible cables and circuits has been in existence for a number of years, but only recently has it started to gain general acceptance. Impetus toward increased usage has come from: (1) a growing awareness of the many advantages of flexible circuits over hard wiring such as reduced weight and volume, ease of handling and installation, reduced possibility of installation errors, ease in providing shielding between both the conductors and the conductor layers, greater mechanical strength, and greater current carrying capacity because of better heat dissipation characteristics; (2) the availability of improved materials and processing techniques; and (3) steadily increasing costs of hard wiring. Formation of such circuits upon flexible substrates gives rise to the requirement for a suitable protective covering. In order to adequately protect the circuit pattern, the covering should be tough yet sufficiently flexible to maintain adherence to the substrate without cracking, buckling, etc. Past approaches have included the application of a Mylar sheet in a laminating press. However, this method has proved to be too expensive to serve as more than a temporary expedient. Attention has thus been turned to settable or curable liquid coating compositions. To be commercially attractive, such coating materials should be relatively inexpensive, be easy to apply, have a reasonably long shelf life, and yet be settable or curable upon application within a time sufficiently short to permit continuous production scale coating operations. In addition, they should have good dielectric properties and resistance to heat such as from soldering or accidental fire.

While a radiation curable organic resin composition would appear to give rise to the expectation of ready coatability coupled with rapid curing, nevertheless none of the many commercially available resins of this type appear to satisfy all of the above criteria. Thus, efforts are under way to develop a coating composition which will satisfy most if not all of the above criteria.

SUMMARY OF THE INVENTION

Radiation curable resin compositions have been developed which exhibit excellent characteristics as coating compositions and particularly as flexible insulating cover coats for printed circuit boards or as wire coatings. The resins are styrenated polyester compositions containing from 25 to 40 weight percent of one or more vinyl monomers including at least 50 percent by weight styrene. The polyesters are the esterification products of one or more unsaturated carboxylic acids, one or more saturated carboxylic acids, one or more short-chain diols and one or more long-chain aliphatic compounds, the unsaturated acid being maleic or an isomer or derivative thereof, the saturated acid being trimellitic or an isomer or derivative thereof, the diols being those having up to six carbon atoms per molecule and their isomers, and the long-chain aliphatic compound having at least two functional hydroxyl groups per molecule.

The acids are present in the molar ratio of maleic acid to trimellitic acid between 1:1 and 8:1. The polyols are present in the molar ratio of short-chain diols to long-chain aliphatic compound between 4:1 and 60:1. The total polyols and acids are present in amounts corresponding to an OH/COOH ratio between 1.1:1 and 1.6:1.

Preferred compositions of these resins additionally contain one or more sensitizers enabling rapid curing of the resins by exposure to ultraviolet radiation, and one or more inhibitors to give acceptable shelf life.

The viscosity of the compositions and hence their coating characteristics may be controlled by varying the ratio of polyester to vinyl monomers within the specified limits, and by the addition of thixotropic agents such as fumed silica.

Fire retardant properties may be obtained either by the addition of fire retardants such as antimony trioxide and chlorinated paraffins, or by incorporation of brominated polyols in the polyester.

DETAILED DESCRIPTION OF THE INVENTION

The presence of an unsaturated acid in the polyester is essential to provide sites for subsequent cross-linking with styrene during curing. The preferred acid for providing such unsaturation is maleic acid, usually in the form of its anhydride. Derivatives or isomers of this acid which may also be used include, but not by way of limitation, fumaric, chloromaleic, dichloromaleic, and mesaconic.

The acids additionally include trimellitic acid ordinarily present in the form of its anhydride, in an amount sufficient to result in a ratio of maleic acid to trimellitic acid between 1:1 and 8:1. Trimeliltic acid, when present within the specified ranges, reduces unsaturation by an amount sufficient to result in enhanced strength of the final cured resin. Exceeding this range by the addition of excess trimellitic acid would reduce the unsaturation of the polyester to the extent that excess styrene would be present in the fully cured resin resulting in degradation of tensile strength and other mechanical properties. Too little trimellitic anhydride would result in an excess of the unsaturated aliphatic acid which would result in unsaturation in the fully cured resin, thus permitting age hardening by oxidation. Based upon the above considerations the ratio of maleic acid to trimellitic acid is preferred to be between 2:1 to 3:1.

The short-chain diols include those having up to six carbon atoms per molecule, such as ethylene glycol, propylene glycol, butane diol and pentane diol, and their isomers. Preferred diols for their availability and compatibility with the other constituents of the resin are propylene glycol and pentane diol. These diols constitute the essential components of the polyols providing the hydroxyl groups needed to react with the acid groups to form the polyester chains.

The long-chain aliphatic compound should contain at least ten carbon atoms per molecule and at least two functional hydroxyl groups per molecule. This compound should be present in an amount sufficient to result in a molar ratio of diols to the compound of between 4:1 and 60:1 in order to introduce mechanical flexibility into the fully cured resin. An excess of the long-chain aliphatic compound, while increasing mechanical flexibility of the fully cured resin would tend to degrade the thermal properties such as resistance to heat, while too little of the compound would of course result in insufficient flexibility. It is preferred for the above purpose to add this compound in an amount corresponding to a molar ratio of between 6:1 and 12:1 of diol to the compound. Typical of such compounds which have been found suitable due to their relatively low materials cost are castor oil and its derivatives such as esters of ricinoleic acid or hydroxy stearic acid or mixtures of these.

It is essential for the achievement of the desired characteristics of the cured resin that the ratio of the total hydroxyl groups contributed by the short-chain diols and the long-chain aliphatic compound to the total acid groups (OH/COOH) be within the range of 1.1:1 to 1.6:1. Below this range the acid value of the fully reacted polyester would be too high, resulting in corrosiveness of the cured resin due to excess unreacted acid in the polyester. Above this range the molecular weight would be too low resulting in insufficient strength and hardness of the resin. Based upon these considerations a ratio of from 1.3:1 to 1.4:1 is preferred.

Polyester formulations based upon the above constituents and molar ratios when fully reacted will result in an acid number in general below 20, indicating an acceptable level of free acid therein. Observance of the preferred ratio of total hydroxyl groups to total acid groups will in general result in an acid number of below 15. A fully reacted polyester is defined as one in which the reaction has been carried out to a point just short of the gel point. Such reaction may conveniently be achieved by heating a mixture of the constituents at a temperature within the range of about 150 to 250° C. for from one to several hours. By way of example, a typical reaction schedule comprises heating the mixture from a temperature of about 170° C. gradually to about 220° C. within a period of three to four hours. It will normally be desired to remove the water which is produced during reaction. Such water removal may be by gas entrainment or formation of a suitable azeotropic mixture such as with toluene. Such procedure will ordinarily result in a fully reacted unsaturated polyester resin having a molecular weight of the order of 1000. The polyester is then cooled to a temperature within the range of about 80 to 120° C. prior to addition of styrene with or without other monomers. Above this temperature range premature reaction with styrene may occur, while below this range the polyester may become too viscous for convenient mixing with the monomer.

It is essential that the monomer contain at least 50 percent by weight of styrene in order for the achievement of cross-linking with the polyester at the unsaturation sites during subsequent curing. The remaining portion of modifying monomer may be an acrylate or methacrylate. The total monomer including styrene should constitute from 25 to 40 weight percent of the total resin below which significant unsaturation would result after curing, thus permitting age hardening, and above which the cured resin would tend to exhibit tackiness. The modifying monomer, preferably methyl methacrylate, tends to provide increased flexibility of the cured resin.

It will ordinarily be preferred to include an inhibiting agent in order to promote a commercially acceptable shelf life. Typical inhibitors include tertiary butyl catechol and hydroquinone or its methyl ether. In general, the catechol is preferred in that it is from 10 to 100 times more efficient than hydroquinone and may typically be present in amounts of from 0.01 to 0.1 weight percent resulting in a shelf life of from about 6 months to 1 year.

These resins may be cured by radiation, such as electron beam radiation or ultraviolet radiation.

To effect curing by ultraviolet radiation, the composition is exposed for a period of up to 10 seconds or more to ultraviolet light emitted from an artificial source having a wavelength in the range between 2000 and 4000, the radiation needed for curing not being critical, but for commercial applications, typically being of an intensity of about 2 to 10 watts per square centimeter of coating surface, upon a preferably moving workpiece.

Typical sources of ultraviolet light include medium pressure mercury vapor discharge tubes in quartz, xenon tubes and low pressure mercury vapor tubes in glass and high pressure mercury vapor discharge tubes in quartz or glass.

Particular conditions of source and distance and the duration of radiation may be determined readily by experimentation. It is preferred to add an ultraviolet sensitizing agent to the resin composition in order to substantially reduce the time required for curing. Typical sensitizers include, but not by way of limitation, benzoin and benzoin methyl ether. Benzoin or its methyl ether when present in the amount of about 0.2 to 2 weight percent enable curing within 5 seconds or less and typically within 2 seconds or less. More than 2 weight percent of the sensitizer would tend to degrade the mechanical properties such as strength or toughness due to a lowering of the molecular weight of the final cured resin while less than 0.2 weight percent would tend to have a negligible effect upon curing time.

Electron beam radiation is generally applied at dose rates of about 0.05 to 100 Mrad per second upon a preferably moving workpiece with the coating receiving a total dose in the range of about 1 to 25 Mrad and most commonly between about 5 and 15 Mrad. The abbreviation "Mrad" as employed herein means one million rad. The term "rad" means that dose of radiation which results in the absorption of 100 ergs. of energy per gram of absorber, for example, the coating film. Electron sources are well known and thus do not form a necessary part of this description. Such dose rates will ordinarily result in a satisfactorily cured resin wthin about 1 to 100 seconds.

As already mentioned, curing is by cross-linking of styrene with the polyester at the maleic anhydride unsaturation locations. An advantage of these resin compositions is that oxygen in the ambient ordinarily does not interfere with curing except at low radiation energies which necessitate curing times of longer than about 1 minute. In such cases oxygen should be excluded in order to avoid low molecular weight and tackiness. One method of excluding oxygen in these situations is to effect the cure under water. Such a procedure has the added advantage of preventing major temperature increases in the substrate.

Where desired, fire retardant properties may readily be incorporated into the resin compositions either by adding separate retardant agents such as arsenic trisulfide, antimony trioxide and chlorinated paraffin or by introducing bromine directly into the resin structure by way of the polyester. Each method has advantages. The addition of retardant agents is generally attractive due to their low cost. Brominated polyesters, while relatively more expensive tend to have a minimal effect upon flexibility of the cured resin and in addition substantially preserve resin transparency. In order to achieve an oxygen index of about 30 (indicating a substantially self-extinguishing state), fire retardant agents should be present in the amount of at least about 40 weight percent while the bromine content of the total resin weight should be to the extent of at least 20 percent of the total weight of the resin. It is stressed that fire retardant properties are not necessary, but may be desired depending upon the particular application envisioned and upon the fire retardant properties of the substrate.

In a preferred coating application, the polyester styrene mixture is coated onto a flexible printed circuit board. It may be desired to apply the coating in a pattern, for example, in order to conserve materials. This may conveniently be carried out by use of a silk screen. As is known in the screening art, the coating material should ordinarily exhibit a viscosity sufficiently high to prevent bleeding through the screen prior to application. Such viscosity for the compositions of the invention may sometimes be achieved only by the addition of a thixotropic agent, such as fumed silica, which is commercially available in one form under the trade name Cab-O-Sil.

Typical flexible substrate materials for these applications include polyethylene terephthalate polyesters, such as that known commercially as Mylar, polyesters fiber reinforced epoxies, glass fiber-reinforced epoxies and glass fiber-reinforced polyesters.

Circuit materials typically include copper with or without minor alloying elements, which may be either selectively etched from a copper clad substrate or selectively deposited on the substrate.

The following examples illustrate the effect of compositional variations within the specified ranges and extent of curing upon mechanical properties such as tensile strength and elongation.

EXAMPLE I

Four polyester resins were prepared, having the compositions shown in Table I.

TABLE I

| | Amount of*— | | | | |
|---|---|---|---|---|---|
| | MA | TMA | CO | PG | PD |
| Composition: | | | | | |
| P1: | | | | | |
| Moles | 2.5 | 1.0 | 0.45 | 5.2 | |
| Wt. percent | 19.1 | 14.96 | 35.07 | 30.87 | |
| P2: | | | | | |
| Moles | 2.0 | 1.0 | 0.3 | 4.75 | |
| Wt. percent | 18.85 | 18.29 | 28.57 | 34.29 | |
| P3: | | | | | |
| Moles | 2.0 | 1.0 | 0.45 | 4.6 | |
| Wt. percent | 16.5 | 16.16 | 37.88 | 29.46 | |
| P4: | | | | | |
| Moles | 2.0 | 1.0 | 0.3 | | 4.5 |
| Wt. percent | 17.04 | 16.7 | 26.09 | | 40.75 |

*MA=maleic anhydride; TMA=trimellitic anhydride; CO=castor oil; PG=propylene glycol; PD=pentane diol.

The components were mixed and heated and beginning at a temperature of 175° C., which temperature was gradually increased to about 220° C. in 3 to 4 hours. After about four hours, the fully reacted resins were cooled to about 100° C. Portions of each resin were then dissolved in one or more vinyl monomers in the proportions shown in Table II.

TABLE II

| | Weight percent of— | | |
|---|---|---|---|
| | | Vinyl monomer | |
| | Polyester composition | Styrene | Methyl methacrylate |
| Composition: | | | |
| 1 | P1, 70 | 30 | |
| 2 | P2, 65 | 35 | |
| 3 | 65 | 25 | 10 |
| 4 | P3, 65 | 35 | |
| 5 | 65 | 25 | 10 |
| 6 | P4, 70 | 30 | |
| 7 | 70 | 15 | 15 |

About 0.1 percent of tertiary butyl catechol and 1.0 percent of benzoin methyl ether were added, based on total weight of resin, to each of the compositions, as inhibitor and sensitizer, respectively, except as otherwise noted below. Each of the resin compositions were then cured into films by exposure to ultraviolet radiation. The cured films were then tested for strength and flexibility using standard ASTM tensile strength and elongation testing techniques. Results for various exposure times are shown in Table III.

TABLE III

| | Exposure (seconds) | Tensile strength (p.s.i.) | Elongation (percent) |
|---|---|---|---|
| Composition: | | | |
| 1 | 3 | 1,980 | 23 |
| | 5 | 2,890 | 19.8 |
| 2* | 2 | 4,320 | 7.6 |
| | 3 | 5,200 | 7.1 |
| | 4 | 5,250 | 6.3 |
| 4 | 3 | 2,340 | 11.8 |
| | 5 | 3,130 | 10.1 |
| 7 | 5 | 2,300 | 21 |

*0.5 percent sensitizer was present in this composition.

As may be seen from the results of Table III, choice of compositions and curing times will ordinarily involve a trade off between tensile strength and elongation. Thus, composition 2 appears to exhibit the highest tensile strengths and the lowest elongations, while compositions 1 and 7 appear to exhibit the highest elongations and the lowest tensile strengths for the group. From Table I it appears that composition 4 results in an optimum balance between tensile strength and elongation. Of course, the particular compositions and exposure times chosen are dependent upon the particular application envisioned. It may in some cases be desirable to achieve maximum tensile strength at the expense of elongation or conversely, maximum elongation at the expense of tensile strength.

EXAMPLE II

The procedure of Example I was followed, except that the resin films contained no sensitizer and were cured by exposing them to electron radiation at the rate of 0.14 Mrad per second. Results are shown in Table IV.

TABLE IV

| | Exposure (Mrads) | Tensile strength (p.s.i.) | Elongation (percent) |
|---|---|---|---|
| Composition: | | | |
| 1 | 12 | 2,430 | 31 |
| | 16 | 2,910 | 23.8 |
| | 20 | 3,300 | 21.2 |
| 2 | 6 | 1,860 | 7.8 |
| | 8 | 5,880 | 6.6 |
| | 12 | 6,110 | 6.6 |
| | 16 | 6,320 | 6.5 |
| | 20 | 6,360 | 6.3 |
| 3 | 6 | 3,830 | 7.2 |
| | 8 | 4,680 | 7.0 |
| | 12 | 4,710 | 7.0 |
| | 16 | 4,700 | 7.0 |
| 4 | 12 | 1,940 | 21.6 |
| | 16 | 2,620 | 15.0 |
| | 20 | 2,840 | 12.8 |
| 5 | 12 | 2,280 | 16.3 |
| | 16 | 2,580 | 15.5 |
| | 20 | 2,510 | 15.5 |
| 6 | 20 | 2,600 | 22 |
| 7 | 20 | 2,200 | 44 |

*0.5 percent sensitizer was present in this composition.

The results of Table IV indicate that good results may be obtained by the use of electron radiation to cure the resin films. Again, an examination of the values for tensile strength and elongation will indicate the necessity for choice of particular composition and radiation exposure dependent upon the mechanical properties desired.

What is claimed is:

1. The process comprising curing a syrenated polyester coating composition by exposing it to ultraviolet radiation, said composition comprising: from 60 to 75 weight percent of an unsaturated polyester resin having an acid number of up to 20, the polyester resin comprising the reaction product of one or more polycarboxylic acids and one or more polyols in amounts corresponding to an OH to COOH ratio between 1.1:1 and 1.6:1 and from 25 to 40 weight percent of one or more vinyl monomers including at least 50 weight percent of styrene: characterized in that the polyols consists of one or more short-chain diols containing up to six carbon atoms and castor oil in the molar ratio between 4:1 and 60:1 diols to caster oil, and further characterized in that the carboxylic acids consist of one or more unsaturated acids selected from the group consisting of maleic, fumaric, chloromaleic, dichloromaleic and mesaconic acid and trimellitic acid in the molar ratio between 1:1 and 8:1 of unsaturated acid to trimellitic acid.

2. A styrenated polyester coating composition which is curable by ultraviolet radiation comprising an ultraviolet sensitizer and a composition comprising: from 60 to 75 weight percent of an unsaturated polyester resin having an acid number of up to 20, the polyester resin comprising the reaction product of one or more polycarboxylic acids and one or more polyols in amounts corresponding to an OH to COOH ratio between 1.1:1 and 1.6:1 and from 25 to 40 weight percent of one or more vinyl monomers including at least 50 weight percent of styrene: characterized in that the polyols consist of one or more short-chain diols containing up to six carbon atoms and castor oil in the molar ratio between 4:1 and 60:1 of diols to castor oil, and further characterized in that the carboxylic acids consist of one or more unsaturated acids selected from the group consisting of maleic, fumaric, chloromaleic, dichloromaleic and mesaconic acid and trimellitic acid in the molar ratio betwen 1:1 and 8:1 of unsaturated acid to trimellitic acid.

3. The composition of claim 2 in which the sensitizer is selected from the group consisting of benzoin and benzoin methyl ether, and is present in the amount of from 0.2 to 2 weight percent of the resin.

4. The process of claim 1 in which the ratio of diols to the castor oil is between 6:1 and 12:1.

5. The process of claim 1 in which the diol is selected from the group consisting of propylene glycol and pentane diol.

6. The process of claim 1 in which the ratio of unsaturated acid to trimellitic acid is between 2:1 and 3:1.

7. The process of claim 1 in which the aliphatic acid is maleic acid.

8. The process of claim 1 in which up to 50 weight percent of styrene is replaced by methyl methacrylate.

References Cited

UNITED STATES PATENTS

| | | | |
|---|---|---|---|
| 3,450,612 | 6/1969 | Rudolph et al. | 204—159.15 |
| 2,997,419 | 8/1961 | Lawton | 204—159.15 |
| 3,709,956 | 1/1973 | Nordstrom | 204—159.15 |
| 3,632,399 | 1/1972 | Burlant | 204—159.19 |
| 3,567,494 | 3/1971 | Fitko | 117—93.31 |
| 3,246,054 | 4/1966 | Guenther et al. | 264—22 |
| 3,247,012 | 4/1966 | Burlant | 117—93.31 |

JOHN C. BLEUTGE, Primary Examiner

U.S. Cl. X.R.

117—212; 204—159.19, 260, 22 CB, 40 R 861